Figure 2:
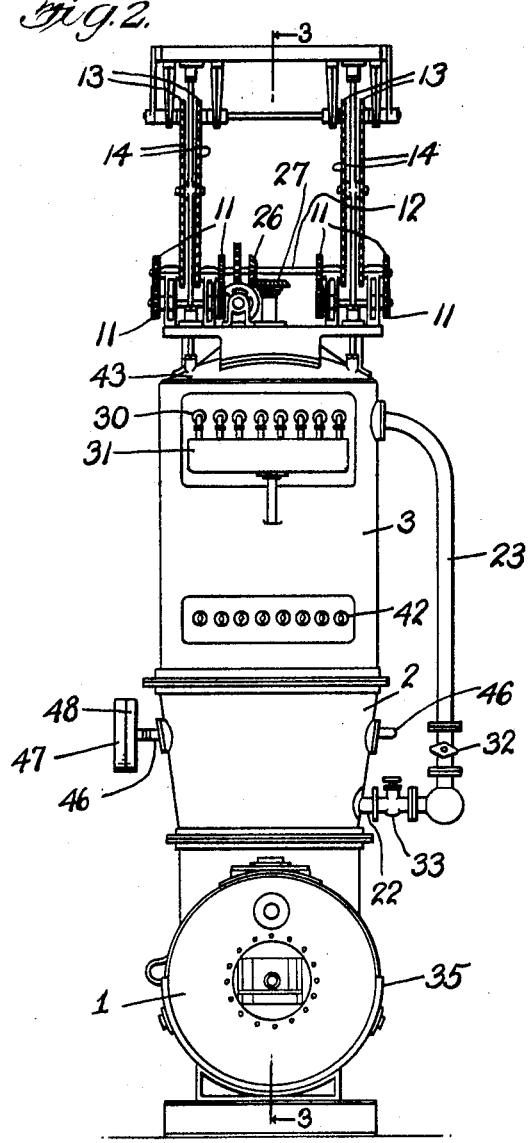

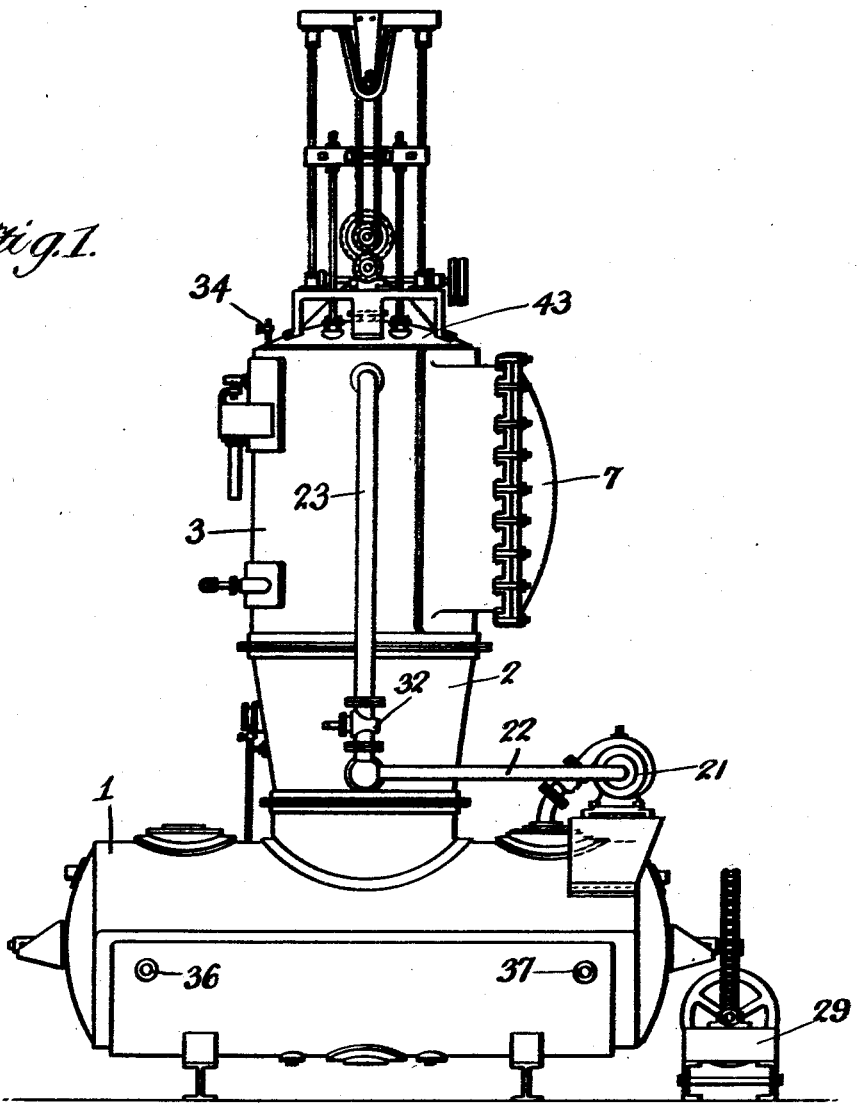
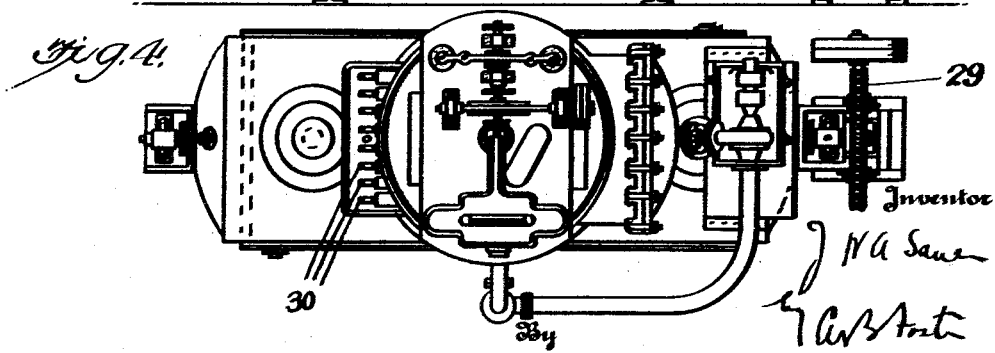

March 1, 1927. 1,619,042
J. N. A. SAUER
APPARATUS FOR TREATING LIQUIDS WITH DECOLORIZING, PURIFYING, AND FILTERING
AGENTS AND FOR SEPARATING UNDISSOLVED SUBSTANCES FROM LIQUIDS
Filed Nov. 2, 1921 9 Sheets-Sheet 2

Inventor
J N A Sauer
By
A B Foster
Attorney

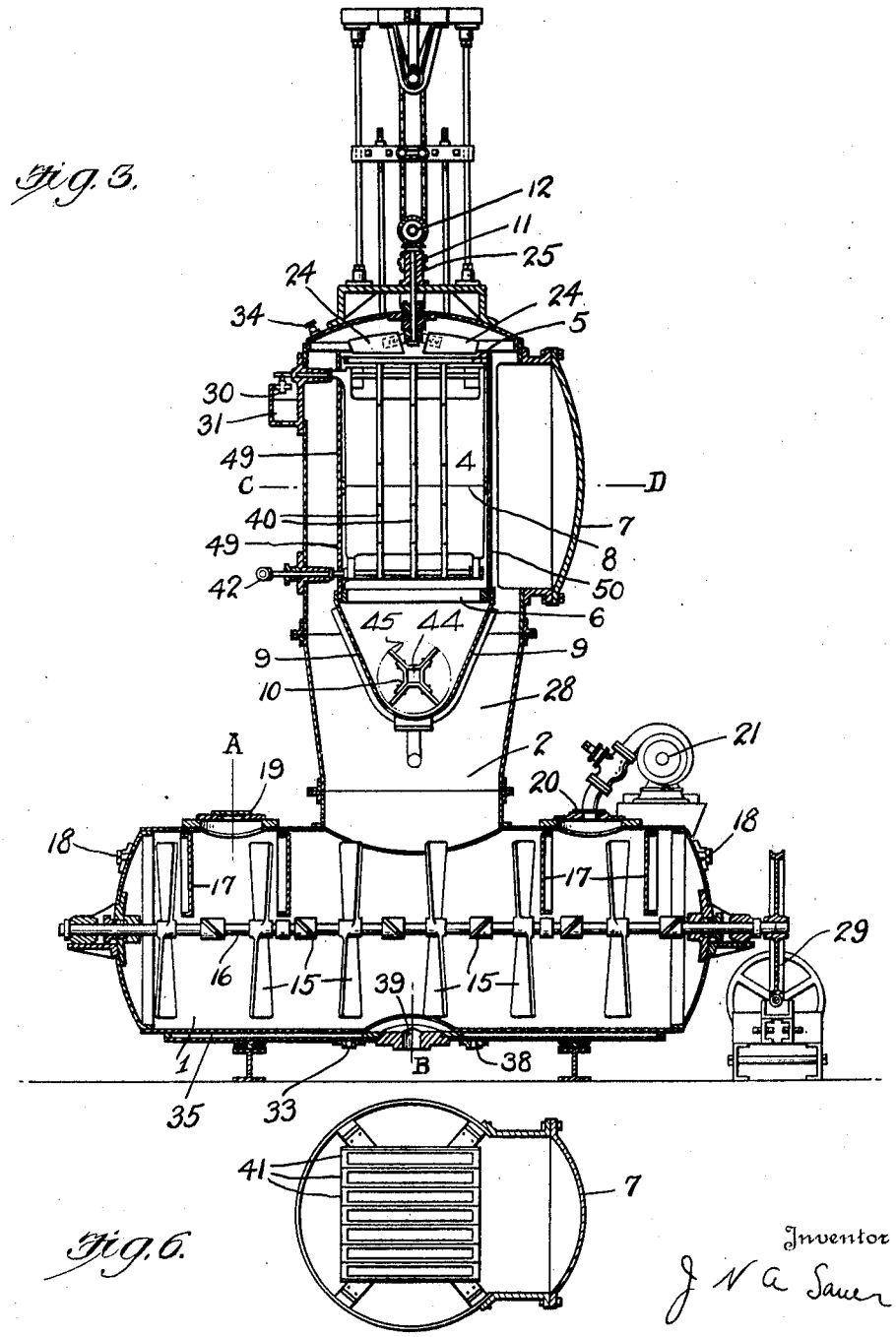

March 1, 1927. 1,619,042
J. N. A. SAUER
APPARATUS FOR TREATING LIQUIDS WITH DECOLORIZING, PURIFYING, AND FILTERING
AGENTS AND FOR SEPARATING UNDISSOLVED SUBSTANCES FROM LIQUIDS
Filed Nov. 2, 1921    9 Sheets-Sheet 4
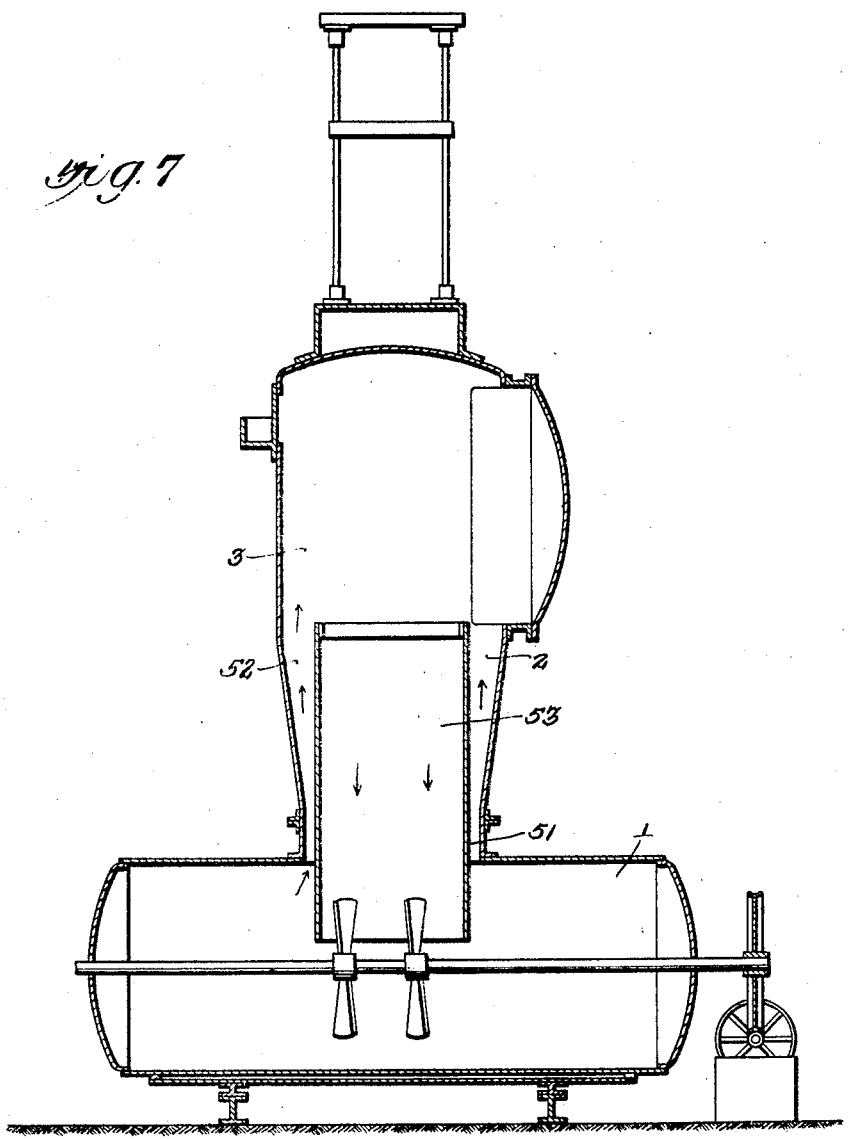

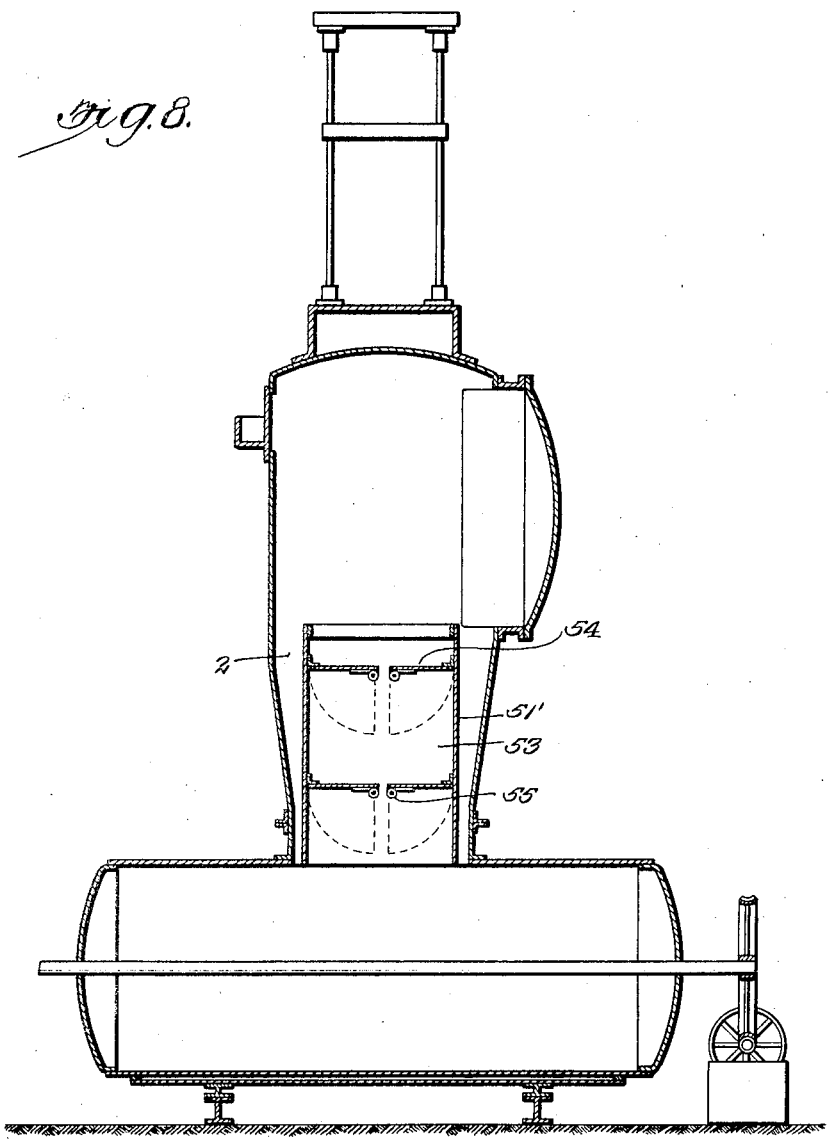

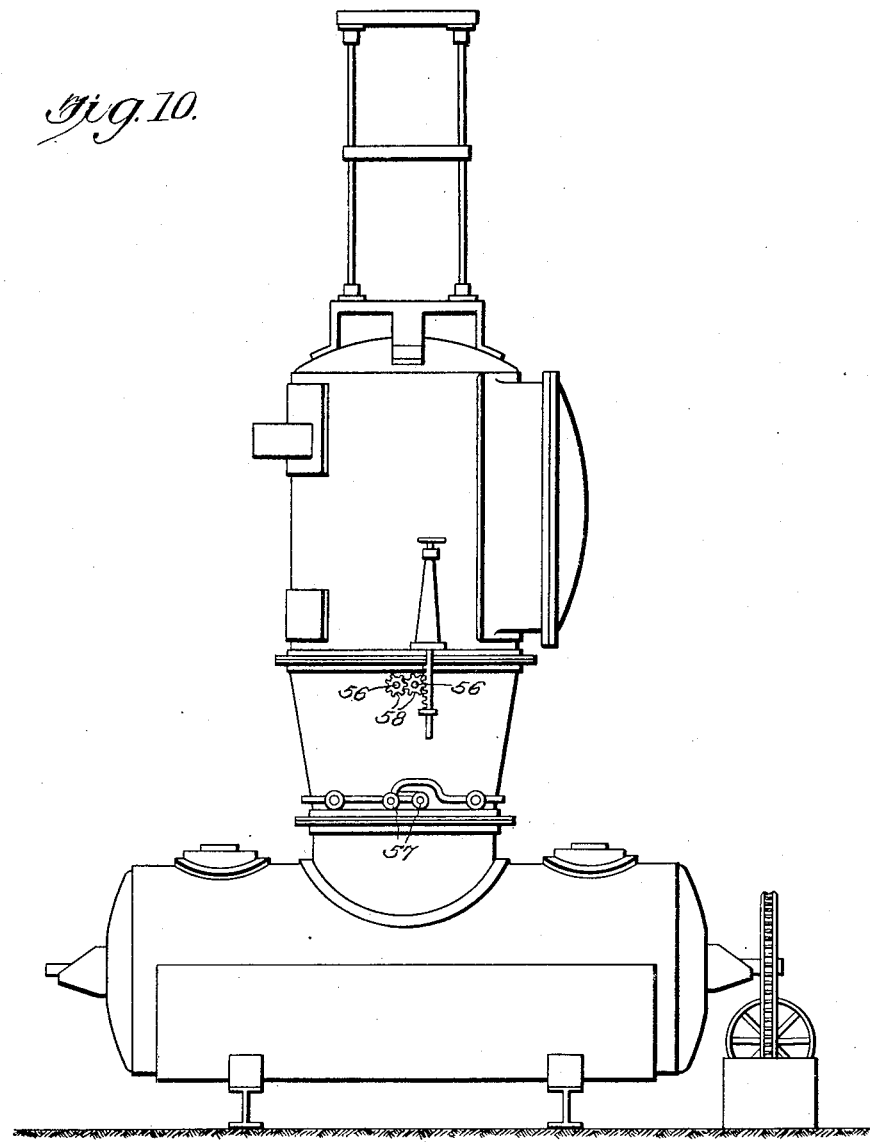

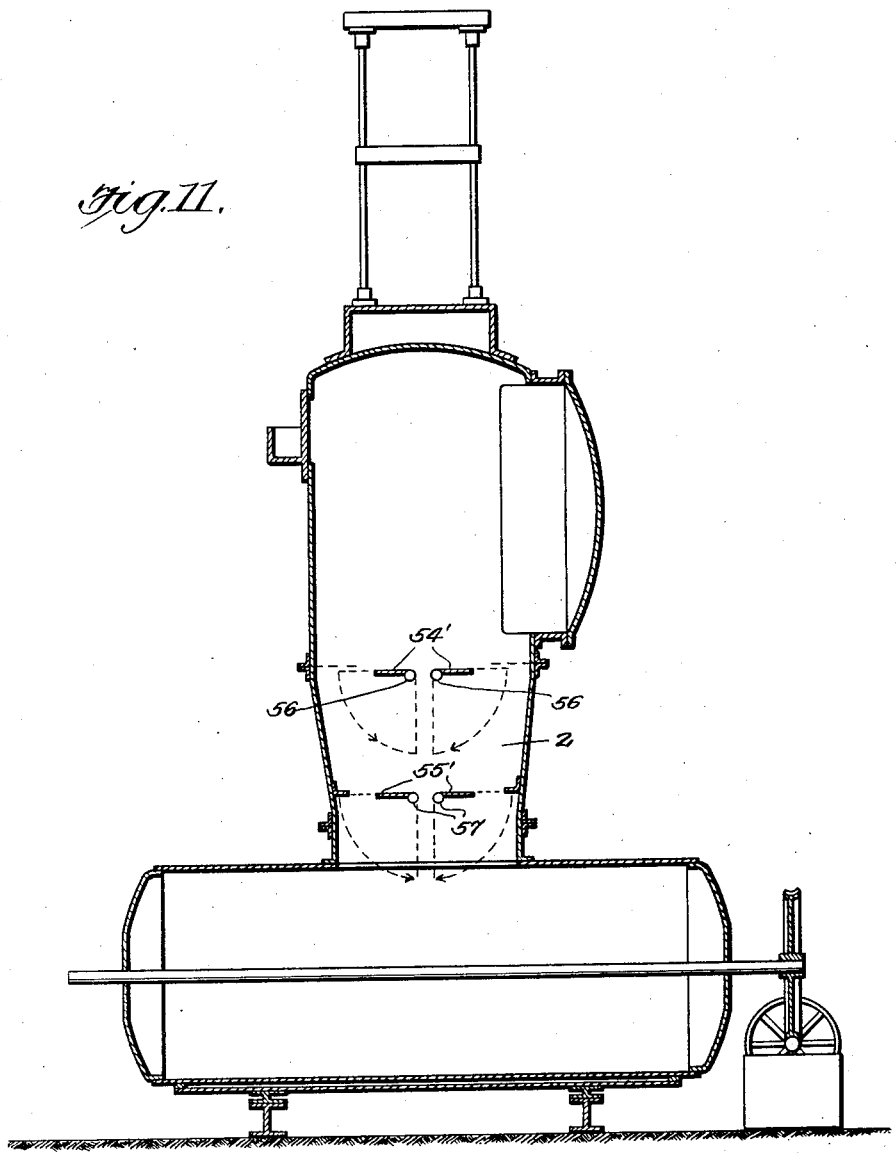

March 1, 1927.  
J. N. A. SAUER  
1,619,042  
APPARATUS FOR TREATING LIQUIDS WITH DECOLORIZING, PURIFYING, AND FILTERING AGENTS AND FOR SEPARATING UNDISSOLVED SUBSTANCES FROM LIQUIDS  
Filed Nov. 2, 1921     9 Sheets-Sheet 9
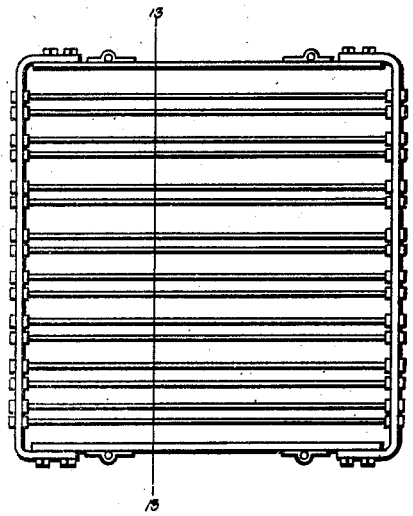
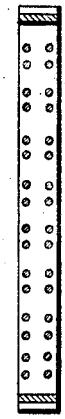
Fig.13.  Fig.13ᴬ.
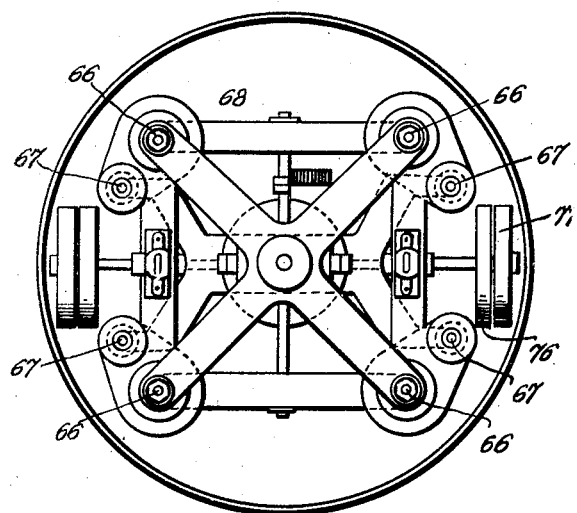
Fig.15.

Patented Mar. 1, 1927.

1,619,042

UNITED STATES PATENT OFFICE.

JOHAN NICOLAAS ADOLF SAUER, OF AMSTERDAM, NETHERLANDS.

APPARATUS FOR TREATING LIQUIDS WITH DECOLORIZING, PURIFYING, AND FILTERING AGENTS AND FOR SEPARATING UNDISSOLVED SUBSTANCES FROM LIQUIDS.

Application filed November 2, 1921, Serial No. 512,355, and in Sweden November 2, 1920.

My present invention relates to improvements made as a further development of the process and apparatus set forth in my Letters Patent of the United States No. 1,533,032 of April 7, 1925.

In said patent I have described a process according to which the liquid to be purified is made to pass through one receptacle, or a plurality of receptacles in series, and during such passage is treated with the decolorizing and the purifying medium or agent in such a manner that the liquid and said agents will be kept mechanically in continuous contact with each other, and that the separation of the liquid from the said agent is also effected within the same receptacle. Thereupon the liquid is removed from the receptacle and the agent separated mechanically is returned to the mixing chamber of the apparatus, while the entire amount of agent remains in the receptacle until the desired degree of exhaustion has been attained.

The above-mentioned receptacles comprise a mixing chamber, a separating device located above said chamber, and an interposed chamber (riser).

In the process described in said patent the path of the liquid to the filter or to the liquid outlet, is not separate from the path of the separated agent to the mixing chamber.

This process yields very acceptable results when the liquid is treated with agents of a specific gravity greater than that of the liquid to be treated, since in that case the agent will be able to overcome the resistance offered by the ascending liquid and will be able to fall back by its own weight within or through such ascending liquid. It has been found, however, that the return of the agent to the mixing chamber takes place but very incompletely, and that great difficulty is experienced in separating the agent from the liquid when their specific gravities differ but slightly or not at all, or when the specific gravity of the liquid is greater than that of the agent.

If for instance a sugar solution of great density, such as, e. g., 60° Brix, or a higher per cent glucose solution or heavy oils, or other liquids of great specific gravity or viscous liquids, are treated with a suitable decolorizing, purifying, and filtering agent which is in a more or less finely divided condition, such as for instance the finely powdered decolorizing carbon known as Norit, the difference between the specific gravity of the liquid and that of the Norit employed is often so small that the weight of the Norit itself will not suffice to overcome the resistance of the upwardly-moving liquid. Thus the Norit will be unable to fall back into the mixing chamber as intended.

The opposing forces will, as it were, bring the downward movement of the agent to a stop, and a portion thereof will remain in suspension, instead of becoming deposited.

This will interfere greatly with the separation of the agent from the liquid. If, for instance, the separator consists of filter elements enveloped in filtering cloths, the agent, in so far as it does not fall back into the mixing chamber immediately, will be deposited again upon the filtering cloths immediately after its separation, owing to the difference between the pressures on both sides of the said filtering cloths. The spaces between the filter elements will, during the operation, become filled with the agent with progressively increasing rapidity, whereby the speed of filtration will be reduced considerably and the scraping of the agent from the filtering cloths rendered very difficult or almost impossible.

The object of the present invention is to overcome these difficulties by altering the process and providing certain novel features in the apparatus. The latter may serve not only to treat liquids with adsorption agents, but also, in general, to free a liquid of substances suspended therein, for instance for the separation of paraffine from gasoline.

According to the present invention, the liquid which has passed from the mixing chamber to the separator is returned to the mixing chamber or vessel through a path entirely separate from the path by which the agent separated in the separator and mixed with the liquid previously, or the undissolved matter is returned to the mixing chamber. By thus using separate paths, I avoid the creation of forces opposing each other and canceling their effects, or at least I insure the condition that these forces, if they arise at all, will not be of sufficient strength to interfere with the proper operation.

In carrying out the present invention, the agent is returned to the mixing chamber in the form of a paste, either directly from the filtering chamber, or from a chamber located exteriorly of said filtering chamber.

In either case, I obtain the advantage that the efficiency of the separation is not affected by the specific gravity of the agents or by the difference between the specific gravity of the suspended substances and that of the liquid, and this advantage applies whether the process consists in a treatment with adsorption agents or in the separation of suspended substances.

The difficulties mentioned above may also be overcome by causing special arrangements or devices to act while the liquid carrying the agent is rising from the mixing chamber to the separator, for the purpose of preventing the ascending liquid from carrying along with it, any considerable amounts of the agent, and for the further purpose of facilitating the return of the agent separated in the separator.

When treating liquids with adsorption agents, the new process will be as follows, in general outline:

The liquid rising from the mixing chamber and carrying along the decolorizing and purifying agent, or the substance to be separated, is conducted to a separator where such agent is separated mechanically from the liquid. The agent thereupon is brought into a collector or receiver, while in the form of lumps or cakes mixed with liquid, or in the form of a paste. The receiver may be located within the space in which the liquid rises, or this latter space may be omitted, in which event the receiver would be built into the mixing chamber. On this receiver is secured detachably a housing enclosing the entire separating device.

In order to return the separated agent to the operation and to cause it to act again on the liquid under treatment, in the mixing chamber proper, the separated agent within this receiver (which is open only at the top) is preferably first converted into a paste-like condition by a mixing device, and while in this condition returned to the mixing chamber, for instance by means of pumps.

When the separator consists of filtering elements having envelopes, e. g. of cloth, certain amounts of the agent will accumulate in many cases, particularly at the upper part of the filter casing. These amounts likewise may be converted into a paste-like condition by a suitable mixing device and then removed thence and brought back to the mixing chamber or drum.

The liquid containing the agent may be removed from the filtering chamber by strong suction, and a circulation obtained by returning the liquid to the mixing chamber, and by this circulation I secure the result that the spaces between the filtering elements will not become filled with the agent, so that it becomes possible to continue the filtering operation for a long time without operating the scraping device, but preferably while continuing the operation of the mixing devices mentioned above. The removal of the liquid containing the agent, by suction, and the return of such liquid may be effected in various ways, for instance by means of a centrifugal pump.

The process and apparatus may also be carried out in a somewhat different form (while retaining the principle of using separate paths for the passage of the liquid to the separator, and for the return of the separated agent or of the separated suspended substances to the mixing chamber), by allowing the separated agent to fall back directly from the separator into the mixing chamber, and still overcoming at the same time the difficulty which arises when there is an insufficient difference between the specific gravity of the liquid and that of the agent or of the suspended substances.

For this purpose, there is arranged in the space between the separator and the mixing chamber, a cylinder open at the top and at the bottom, or a conveying pipe open in the same manner, connected with the separator and reaching, for instance, into the mixing chamber.

With this arrangement, the following effect will be obtained:

At the beginning of the operation, the liquid which carries with it the agent for treating it, or which contains suspended substances, will travel upwardly both in the space between the separator and the mixing chamber, and in the cylinder contained in said space. As soon, however, as the separated agent is within this interior cylinder, a resistance will arise, and in consequence thereof, the liquid will no longer rise through the interior cylinder, but through the space surrounding such cylinder.

The amounts of separated agent which crowd progressively into the interior cylinder, will gradually force or press such agent back into the mixing chamber.

This return of the separated amounts of the agent may be improved or assisted by devices arranged within said interior cylinder. Such devices may be, for instance, screws having imperforate helical surfaces, or a propeller the arms or blades of which effect a downward flow of the material. The material might also be thrown against the inner wall or surface of the interior cylinder, whereby the falling of the agent back into the mixing chamber may be promoted. By the aid of centrifugal force the ascending liquid, which carries the agent with it, may be treated in such a manner as to throw out the said agent and cause it to fall back into the mixing chamber.

In order to secure a very efficient operation of the agent, both the portion of the agent returned to the mixing chamber, and the portion of the agent already present in said chamber, may be caused to act on the liquid on the counter-current principle, that is, both portions of the agent may be made to travel in a direction opposite to that of the liquid.

In this connection, the mixing and feeding device working in the mixing chamber may preferably be arranged in such a manner that its stirrer arms, during the mixing operation, will rotate in a direction opposite to the direction in which the liquid to be treated travels forward.

For the separation of the agent from the filtering cloths, I may use steel wire set tightly in a frame in such a manner that there will be two wires between each two adjacent filter elements.

The removal of the agent from the filtering cloths may also be effected by means of compressed air introduced into the filter elements.

If the wire scrapers mentioned above are employed for scraping the agent off the filtering cloths and if compressed air is employed at the same time, such air will cause the cloths to bulge so that material may be scraped from them thoroughly without any danger of injuring them. In lieu of compressed air, I may employ some other gaseous medium under pressure, for instance steam.

If during the introduction of compressed air into the filter elements the supply of liquid is cut off, so that the separation of liquid will be interrupted, the removal of the agent from the filtering cloths may be accomplished without operating the scrapers. Owing to the bulging of the filtering cloths the cakes or deposits adhering to the said cloths will drop of themselves from the said cloths, since the liquid in the receptacle is stationary.

When using an interior cylinder below the separator, it may be desirable to impede the passage of the liquid upwardly through the cylinder and thus produce a state of comparative rest therein; for this purpose, the cylinder may be provided, if desired, with one or more partitions, arranged transversely, which may be perforated.

In case two or more partitions are used, these will be arranged within the cylinder at intervals from or above each other. These partitions may consist of two or more parts each of which may be operated independently of the others, or alternately (for instance by swinging them open or sliding one over another), and which clear or close the passage through the interior cylinder mentioned above.

The swinging open or shifting, or the opening and closing of the partitions or other parts of these parts may be effected in any suitable manner, for instance by connecting them by means of chains or of a pull rod movable in a packing box provided in the wall of the receptacle and adapted to be turned or shifted from the outside.

The effect of these transverse partitions is as follows:

If for instance two spaced superposed transverse partitions are employed, let us assume that the lower one is closed and the upper one opened. This will oppose a resistance to the ascending movement of the liquid through the cylinder, and the separated amounts of the agent will collect on this lower partition. After there has been a sufficient accumulation of agent on said lower partition, the upper partition is closed and the lower partition opened, thereby causing the accumulated agent to fall back into the mixing cylinder or chamber.

As soon as the collected amount of agent has fallen into the mixing chamber or drum, the lower partition is closed and the upper one opened again.

The arrangement for regulating the direct flow of the separated agent from the separator to the mixing chamber or drum may also be embodied in a form in which the riser itself is provided with the above-mentioned transverse partitions, if desired with the use of an open conveying pipe or cylinder built into the apparatus unit. In this case it is necessary to employ partitions having perforated portions, or perforated throughout their extent, in order to afford an opportunity for the liquid to travel upward to the separator.

When the open cylinder is omitted from the chamber or space in which the liquid rises, the return conduit, separate from the path of the liquid, for conveying the material to the mixing chamber, may be formed by providing an interior space open at the top and having a movable cover and a movable bottom for opening and closing it.

This cover and this bottom may be opened and closed in the same manner as described above in connection with the transverse partitions.

The separated agent is received in this space when the bottom is closed and the cover open, whereupon, by closing the cover and opening the bottom, the agent is caused to fall back into the mixing chamber or vessel.

In this construction also, I may employ the perforated partitions mentioned above.

If the process is simply a separating treatment, the liquid with matter suspended therein is preferably pumped into the space between the mixing chamber and the separator.

When during this operation a sufficient amount of the substances to be separated has collected, the final separation may be effected by evaporation or by draining off the liquid or semi-liquid mixture and exposing it to centrifugal action.

Figure 9:
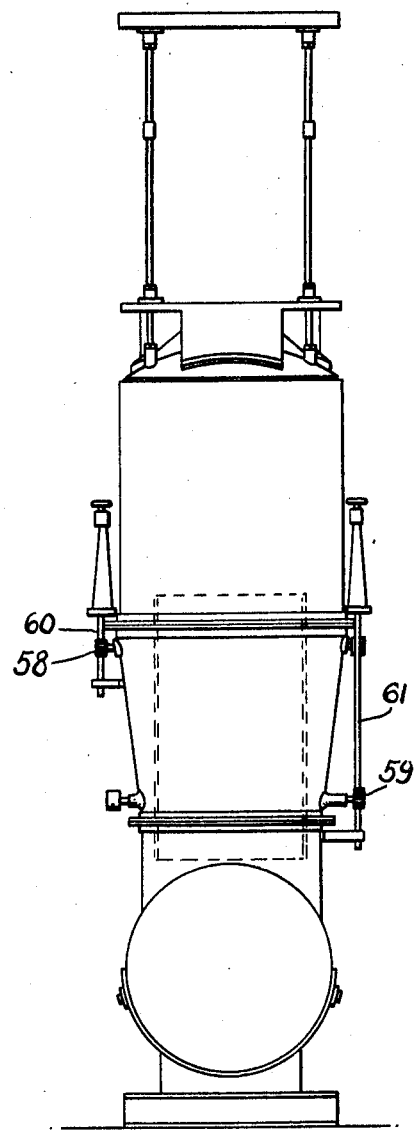
Figure 5:
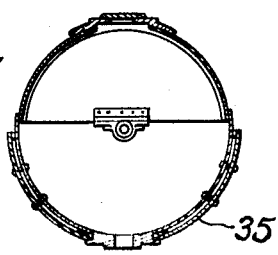
Figure 12:
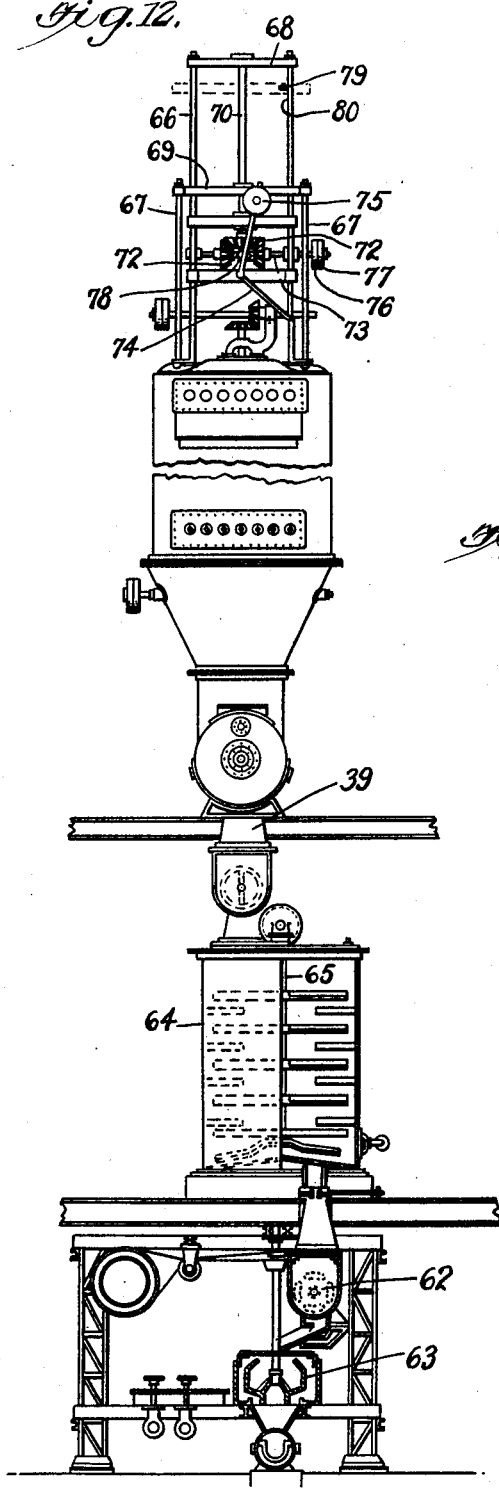
Figure 14:
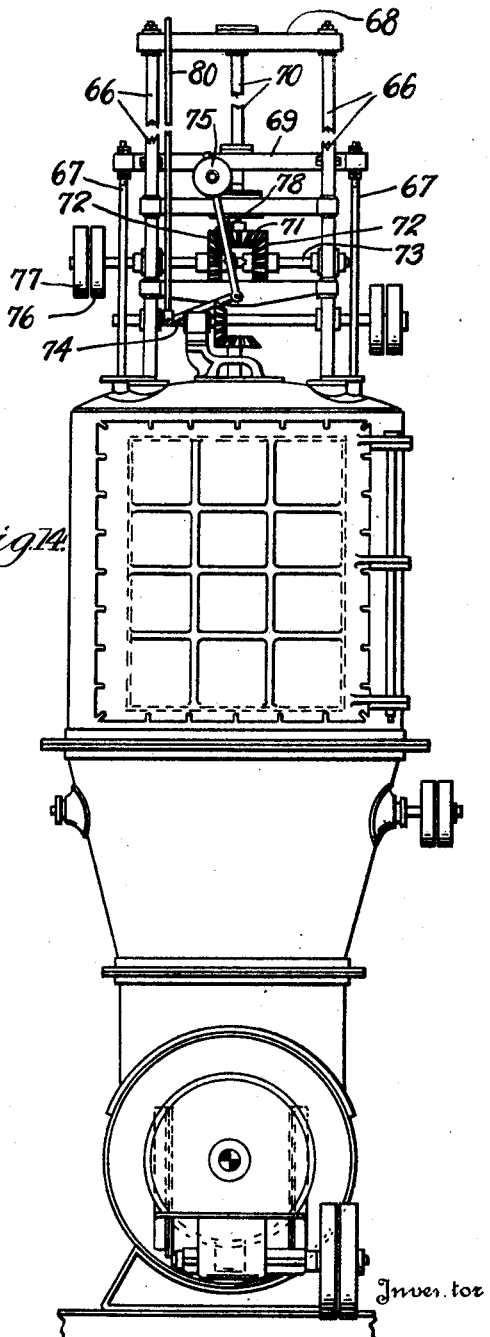

Several satisfactory and preferred embodiments of my present invention are shown in the accompanying drawings, in which Fig. 1 is a side elevation of one of the units of the apparatus; Fig. 2 is a front elevation thereof, with parts in section; Fig. 3 is a vertical section on line 3—3 of Fig. 2; Fig. 4 is a plan view of the apparatus shown in Figs. 1, 2, and 3; Figs. 5 and 6 are sections taken on lines A—B and C—D respectively of Fig. 3; Fig. 7 is a longitudinal vertical section showing a unit with devices, located within the receptacle, for independently regulating the course of the liquid and of the agent respectively; Fig. 8 is a similar view of another arrangement for the same purpose; Fig. 9 is an end elevation, and Fig. 10 is a side elevation of a unit having a third form of arrangement for this purpose; Fig. 11 is a longitudinal vertical section of a fourth such arrangement; Fig. 12 is a front elevation, with parts in section; Fig. 13 shows the scraping device in top view, upon an enlarged scale; Fig. 13$^a$ is a section on line 13$^a$—13$^a$ of Fig. 13; Fig. 14 shows the upper part of the apparatus, in rear elevation; and Fig. 15 is a plan view of the receptacle, showing the scraping device upon an enlarged scale.

At 1 I have indicated the mixing chamber or mixing drum, at 2 the riser or conduit for the ascending liquid, mixed with the treating agent, and at 3 the filter casing to which such mixture is delivered. In this casing the filter elements 4, of suitable number and spacing, are located, the upper and the lower ends of said elements being held in a frame 5, 6. Normally, that is to say, during the operation, these filter elements are stationary, but they may be shifted horizontally in the frame 5, 6 and may also be removed from the apparatus through the door 7, for the purpose of cleaning the filtering cloths and the filter frames. At 8 I have indicated a mechanical scraping device which is movable vertically and which during such movement scrapes off the agent deposited on the filter elements 4. The number of scrapers employed in this scraping device varies according to requirements. At 9 I have indicated a collector and mixing compartment located within the apparatus, in the riser 2, beneath the filter elements 4, and serving to catch the agent which has been scraped off the filter elements 4 by the scraping device 8 and which has thus been caused to drop off said filter elements.

A mixing device 10 is provided for the purpose of bringing the agent gathered in the collector 9, together with the liquid contained in the receptacle, into a homogeneous condition by stirring.

This mixing device comprises a shaft 44 carrying stirrer arms 45. This shaft is journaled in stuffing boxes 46 and is provided, at one end, with a fast pulley and a loose pulley, one of which is indicated at 47, and the other at 48.

Upon the mixing compartment 9 is set removably a casing 49 enclosing all of the filter elements 4. This casing is provided, on the side facing the door, with a removable part 50, after the removal of which, if the door 7 is open, the filter elements 4 may be taken out of the apparatus.

The mixer blades are indicated at 15. Transverse partitions or baffles 17 are provided to promote the mixing action. The liquid to be treated is admitted at 18, while the cover 19 normally closes an opening through which the purifying etc. agent may be introduced into the mixing chamber or mixing vessel 1. At 21 I have indicated a centrifugal pump the suction port of which is connected by a pipe 22 with the mixing compartment or collector 9, while the delivery port of said pump is connected with the upper portion of the mixing drum 1, preferably near the end opposite to the inlet 19 for the treatment agent. By means of an additional pipe connection 23 the pump 21 may be connected with the filter casing 3; in this latter case, said pipe 23 is preferably connected with the filter casing at as high a level as practicable.

The liquid rises from the mixer 1 to the filters through a riser or conduit 28. Above the filters is located a screw blade 24 rotated by means of a shaft 25 and serving to prevent the mass from caking together. This shaft 25 is driven from the shaft 12 by means of bevel gearing 26, 27. The continuous withdrawal of the paste enables filtration to be continued for a long time without operating the scraping device 8.

The shaft 16 on which the mixer blades 15 are secured is operated from the main drive 29. The liquid which has been treated is removed from the filter casing 3 by means of cocks 30, from which it is delivered to a trough or gutter 31, the decolorized and purified liquid being carried away from this trough in any suitable manner, for instance by means of the central drain pipe indicated in Figs. 2 and 4.

The up-and-down movement of the scraping device 8 may be obtained in any suitable manner. In the drawing I have shown, by way of example, a drive comprising endless chains 14, sprockets 13, a shaft 12, and toothed gearing 11. The traveling movement of the endless chains and the resulting up-and-down movement of the scraping device 8 may be effected in any well-known or approved manner, as by a mechanical drive with belt, rope, or chain.

Another construction of the mechanism for moving the scraping device up and down is shown in Figs. 12, 14, and 15. Here the scrapers 8 are secured to the lower ends of the carriers 66, the upper ends of which are secured to a frame 68. When the carriers 66 are moved alternately up and down, the scrapers 8 will, at each stroke, scrape off the cakes which the agent has formed on both sides of the filtering cloths. The carriers 66 are operated by means of a toothed drive comprising a rack 70 and bevel gears 71, 72, actuated in turn from a pulley 76 fast on a shaft 73.

The up-and-down movement of the carriers 66 is obtained by means of a reversing device comprising a jaw-clutch 78, a lever 74 provided with a counter-weight 75, and a rod 80 provided with a lug 79. The coupling or clutch 78 will alternately establish connection between one or the other of the bevel gears 72 and the bevel gear 71, so as to produce the up-and-down movement. Both bevel gears 72 are fast on the aforesaid shaft 73, which in addition to the fast pulley 76 also carries a loose pulley 77, the usual belts being provided in connection therewith.

While only one riser 2 and only one filter casing 3 have been shown in connection with the mixing vessel 1, it will be obvious that a plurality of risers and of filter casings might be provided in connection with the same mixing vessel; furthermore, instead of connecting the riser and the filter casing with the central portion of the mixer, as shown, this connection might be effected at some other point of the mixing vessel. When only a single riser 2 and a single filter casing 3 are employed, it is preferable to locate them at the extremity of the mixing vessel 1 which is opposite to the liquid-inlet. The mixing vessel 1 might be disposed vertically instead of horizontally.

When set in motion, the scraping device 8 will scrape the treatment agent from the filter elements 4 and will reach the collector and mixing compartment 9 by a path which is entirely separate from that of the liquid under treatment; in said collector and mixing compartment 9, the treatment agent may be brought into the form of a paste.

Preferably the centrifugal pump 21 is set in motion at the very beginning of the operation or treatment, so that the portion of the agent returned to the mixing vessel will act again on further amounts of the liquid supplied continuously through the inlet or inlets 18.

A blow-off valve 34 may be provided in connection with the upper portion 43 of the filter casing 3 so as to afford means for the escape of any air which may accumulate therein.

In order that the liquid under treatment may be maintained at the temperature best suited for the operation, the mixing vessel 1 may be provided with a jacket 35 with an inlet 36 for the admission of a heating medium, for instance steam, and with an outlet 37 for such medium.

In scraping the treatment agent off the filtering cloths, the scraping device 8 leaves a thin layer of such agent upon them, owing to the provision of plates 40 on such filtering cloths of the filter elements 4, such plates preventing the scrapers proper 41 of the scraping device 8 from touching and injuring the filtering cloths. A complete removal of the agent from the filtering cloths may then be effected by blowing compressed air into the filter elements through openings 42 the number of which corresponds to that of said elements. The admission of compressed air will cause the filtering cloths to bulge outwardly, and the portion of the agent still adhering to the filtering cloths is scraped off the outer surfaces of said cloths by the scrapers proper 41 of the device 8, without injuring said cloths. This ridding of the filter elements of the treatment agent adhering thereto, by means of compressed air is preferably effected after first shutting off the supply of liquid to said elements. The separation after exhaustion of the treatment agent may be effected in the same manner as described in my earlier application referred to at the beginning of this specification.

In Fig. 7, a cylinder or tube 51, open at the top and at the bottom, is arranged within the riser 2. With this construction, the liquid mixed with the treatment agent will pass upwardly in the space 52 surrounding said cylinder, to reach the filter casing 3, while the agent scraped off the filters will fall back into the mixing vessel 1 through the interior space 53 of said cylinder, which space, at its upper end, is immediately adjacent to the filtering chamber.

In the construction illustrated by Fig. 8 the cylinder 51' located within the riser 2 is provided with two superposed transverse partitions or bottoms 54, 55, hinged so that they may be turned either to a vertical or to a horizontal position. The shifting of these bottoms from one position to the other may be effected by any suitable mechanism.

Figs. 9 and 10 illustrate as an example, one form of mechanism suitable for operating pivoted bottoms such as those of Fig.

8. Each of these bottoms is made in two halves pivoted about separate axes (56 for the upper partition 54, and 57 for the lower partition 55), which axes are constituted by shafts to which the respective halves of said partitions or bottoms are secured. Each of said shafts 56, 57 is connected by toothed gearing 58, 59 respectively with a vertical rod or shaft 60, 61 respectively, and by turning the shafts 60, 61 about their vertical axes said toothed gearing is operated to swing the partition halves on their pivots to the open (vertical) or closed (horizontal) position, according to the direction of rotation.

In the construction illustrated by Fig. 11, the riser 2 itself is provided with two superposed perforated partitions or bottoms 54', 55' mounted pivotally and adapted to be swung into a horizontal or a vertical position by any suitable mechanism, for instance by means of the same character as those described in connection with Figs. 9 and 10.

By reference to Fig. 3 it will be noted that the mixer blades 15 are inclined or helical blades having opposite pitch on opposite sides of the central vertical axis of the riser 2, so that the blades on opposite sides of said axis, being of opposite inclination, will, although rotating in the same direction, exert a propelling or feeding action in opposite directions lengthwise of the shaft 16. The direction of rotation and the blade inclinations are preferably such as to exert a propelling action, longitudinally of the shaft 16, in a direction opposite to the flow of the liquid, thus exerting both on the original agent and on the return agent, an agitating action which will mix such agent thoroughly with the liquid.

I desire it to be understood that various modifications may be made without departing from the nature of my invention. As for instance the treatment agent to be returned to the mixing vessel if desired is conveyed by a pump, the filter need not necessarily be located above said vessel, but it may be arranged at the end of this vessel and communicating therewith or the mixing vessel itself may be arranged vertically or inclined instead of horizontally.

I claim as my invention:

1. An apparatus of the class described, comprising a mixing vessel, a filter arranged above said vessel and communcating therewith, a collector located between the filter and the mixing vessel, a mixer in said collector, and a pump having a connection to said collector, another connection to the upper portion of the filter, and a third connection to the mixing vessel.

2. An apparatus of the class described, comprising a mixing vessel, a filter located above said vessel and communicating therewith, a collector located between the filter and the mixing vessel, to catch material dropping from the filter, and a pump having a connection to said collector, another connection to the upper portion of the filter, and a third connection to the mixing vessel.

3. An apparatus of the class described, comprising a mixing vessel, a filter and a container therefor located above said vessel and communicating therewith, a collector located in said container between the filter and the mixing vessel, to catch material dropping from the filter, and a pump for withdrawing material from said collector and conveying it to the mixing vessel.

4. An apparatus of the class described, comprising a mixing vessel, a filter and a container therefor located above said vessel and communicating therewith, a collector located in said container between the filter and the mixing vessel, to catch material dropping from the filter, and means for returning material from the collector to the mixing vessel.

5. An apparatus of the class described, comprising a mixing vessel, a filter and a container therefor located above said vessel and communicating therewith, and means for withdrawing material from a point above the filter and conveying such material to the mixing vessel.

6. An apparatus of the class described, comprising a mixing vessel, a filter located above said vessel, a riser connecting said vessel with said filter, a collector located in said riser and adapted to catch material dropping from said filter, and means for conveying material from said collector to the mixing vessel.

7. An apparatus of the class described, comprising a mixing vessel, a filter located above said vessel, a riser connecting said vessel with said filter, a collector located in said riser and adapted to catch material dropping from said filter, a mixer in said collector, and means for conveying the mixture from said collector to the mixing vessel.

8. An apparatus of the class described, comprising a mixing vessel, a filter and chamber in open connection with said vessel, a collector located beneath the filter and in said chamber to collect material dropping from the filter and a conveying device having a connection to said collector and another connection to the mixing vessel in proximity to the place where the fresh liquid is introduced.

9. An apparatus of the class described, comprising a mixing vessel, a filter arranged in a casing, said casing communicating with said mixing vessel, agitators for keeping material suspended in the filter casing in movement and a conveying device having a connection to said casing and another connection to the mixing vessel in proximity to the place, where the fresh liquid is introduced.

10. An apparatus of the class described, comprising a mixing vessel, a filter, arranged in a casing and communicating with said vessel, agitators for keeping material suspended in the filter casing in movement, a collector located in the lower part of the filter casing and a pump having a connection to said collector and another connection to the mixing vessel in proximity to the place, where the fresh liquid is introduced.

11. An apparatus of the class described comprising a mixing vessel, a filter and chamber therefor in open connection with said mixing vessel, a collector beneath said filter and in communication with said chamber to collect material dropping from said filter.

12. An apparatus of the class described comprising a mixing vessel, a filter and chamber therefor in open connection with said mixing vessel, a collector beneath said filter in communication with said chamber to collect material dropping from said filter and in communication with said mixing vessel to deliver material thereto.

In testimony whereof I have signed this specification.

JOHAN NICOLAAS ADOLF SAUER.